United States Patent
Kutty et al.

(10) Patent No.: US 10,581,697 B2
(45) Date of Patent: Mar. 3, 2020

(54) SDN CONTROLLED POE MANAGEMENT SYSTEM

(71) Applicant: Dell Products L.P., Round Rock, TX (US)

(72) Inventors: Ajan Daniel Kutty, Austin, TX (US); Srinivasa Rao Nagalla, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 32 days.

(21) Appl. No.: 15/469,206

(22) Filed: Mar. 24, 2017

(65) Prior Publication Data

US 2018/0278488 A1    Sep. 27, 2018

(51) Int. Cl.
*H04L 12/24* (2006.01)
*H04L 12/10* (2006.01)

(52) U.S. Cl.
CPC .............. *H04L 41/22* (2013.01); *H04L 12/10* (2013.01)

(58) Field of Classification Search
CPC .......... H04L 41/22; H04L 12/10; H04L 49/30
See application file for complete search history.

(56) References Cited

U.S. PATENT DOCUMENTS

| | | | | |
|---|---|---|---|---|
| 9,426,113 B2* | 8/2016 | Mahadevan | ........... | H04L 67/025 |
| 9,432,260 B2* | 8/2016 | Wang | ................. | H04L 41/0886 |
| 9,665,148 B2* | 5/2017 | Hamdi | ................ | G06F 1/266 |
| 9,891,678 B2* | 2/2018 | Butcher | ................ | G06F 1/266 |
| 10,374,947 B2* | 8/2019 | Callard | ............... | H04L 12/4633 |
| 2004/0164619 A1* | 8/2004 | Parker | .................... | H04L 12/10 307/80 |
| 2007/0074052 A1* | 3/2007 | Hemmah | ................ | H04L 12/10 713/300 |
| 2007/0162620 A1* | 7/2007 | Terry | ...................... | H04L 12/10 709/253 |
| 2008/0100141 A1* | 5/2008 | Lee | ......................... | H02J 1/102 307/43 |
| 2009/0055672 A1* | 2/2009 | Burkland | ............... | H04L 12/10 713/340 |

(Continued)

OTHER PUBLICATIONS

Shu et al, "Traffic engineering in software-defined networking: measurement and managaement",Jun. 2016, IEEE.*

*Primary Examiner* — Parth Patel
(74) *Attorney, Agent, or Firm* — Haynes and Boone, LLP

(57) ABSTRACT

A Software Defined Networking (SDN) controlled Power over Ethernet (PoE) management system includes a plurality of Power Sourcing Equipment (PSE) networking devices that are each configured to provide both power and data over a network connection to a powered device. An SDN controller device that is coupled to each of the plurality of PSE networking devices. The SDN controller device detects each of the plurality of PSE networking devices. The SDN controller may then receive, from each of the plurality of PSE networking devices, a first SDN communication that includes Power over Ethernet (PoE) information for that PSE networking device. The SDN controller device may then generate a management graphical user interface that is configured to display any of the PoE information that was received in the first SDN communications from each of the plurality of PSE networking devices.

17 Claims, 10 Drawing Sheets

(56) References Cited

U.S. PATENT DOCUMENTS

| | | | |
|---|---|---|---|
| 2010/0031070 A1* | 2/2010 | Tomomitsu | H04L 12/10 713/300 |
| 2012/0230209 A1* | 9/2012 | Diab | H04L 12/10 370/252 |
| 2013/0013949 A1* | 1/2013 | Mohammed | G06F 1/266 713/340 |
| 2014/0092884 A1* | 4/2014 | Murphy | H04L 69/03 370/338 |
| 2014/0129853 A1* | 5/2014 | Diab | H04L 12/413 713/310 |
| 2014/0195831 A1* | 7/2014 | Hamdi | G06F 1/3296 713/320 |
| 2014/0245031 A1* | 8/2014 | Hamdi | G06F 11/3062 713/300 |
| 2015/0227182 A1* | 8/2015 | Teeter | G06F 1/263 713/300 |
| 2015/0245189 A1* | 8/2015 | Nalluri | G06Q 50/265 455/404.1 |
| 2015/0312853 A1* | 10/2015 | Chandrasekaran | H04W 52/0209 370/311 |
| 2015/0331464 A1* | 11/2015 | Balasubramanian | G06F 13/387 713/310 |
| 2016/0087446 A1* | 3/2016 | Zainaldin | H04L 12/10 307/104 |
| 2016/0113006 A1* | 4/2016 | Murphy | H04W 24/04 370/338 |
| 2016/0149779 A1* | 5/2016 | Sampath | H04L 43/0817 370/250 |
| 2016/0170461 A1* | 6/2016 | Stellick | G06F 1/266 713/310 |
| 2016/0191256 A1* | 6/2016 | Wendt | H04L 12/10 713/300 |
| 2016/0265224 A1* | 9/2016 | Byers | E04G 23/00 |
| 2016/0380868 A1* | 12/2016 | Hollis | H04L 47/10 370/252 |
| 2017/0048290 A1* | 2/2017 | Cui | H04L 65/4076 |
| 2017/0085434 A1* | 3/2017 | Young | H04L 41/22 |
| 2017/0214533 A1* | 7/2017 | Chen | H04L 12/10 |
| 2018/0191600 A1* | 7/2018 | Hecker | H04L 45/02 |

* cited by examiner

SDN CONTROLLED POE MANAGEMENT SYSTEM

BACKGROUND

The present disclosure relates generally to information handling systems, and more particularly to the management of a Power over Ethernet (PoE) enabled network via a Software Defined Networking (SDN) controller.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, networking devices, are configured to provide power as well as data over the same network connection. For example, some switches are enabled with Power over Ethernet (PoE) subsystems that are configured to provide electrical power along with data on twisted pair Ethernet cabling, which allows a single network cable to provide both data connections and electrical power to powered devices such as, for example, wireless access points, IP cameras, and Voice over Internet Protocol (VoIP) phones. Conventionally, such PoE capable switches are managed in an isolated and manual manner, with a network administrator required to access the switch via its Command Line Interface (CLI) and provide CLI commands to enable PoE on a port, list the powered devices connected to the switch, retrieve power utilization statistics, and/or perform a variety of other PoE management actions known in the art. The manual and isolated manner in which PoE capable switches are managed is a time consuming and error prone process, and those issues are exacerbated as the number of PoE capable switches increase in a network.

For example, when a powered device is connected to a switch in the network and the power available in that switch is scarce, the network administrator must manually check the PoE capabilities and availability in the switches in the network until a switch is identified that is both PoE capable and has sufficient power available for the powered device. However, network administrators typically do not wish to perform such time consuming processes, which often results in the powered device being connected to an underpowered switch, and requires that powered device to wait for power to become available from that switch. In such situations, if the powered device is categorized as a low priority powered device, the wait for power may be acceptable. However, a high priority powered device will require the compromise of power to one or more other powered devices connected to that switch to ensure sufficient power for the high priority powered device. As such, current PoE management systems provide for individual management of PoE devices via manual processes, which increases the chance for management errors and greatly limits the benefits that could be realized from more centralized management of the PoE network.

Accordingly, it would be desirable to provide an improved PoE management system.

SUMMARY

According to one embodiment, an Information Handling System (IHS) includes a communication system; a processing system that is coupled to the communication system; and a memory system that is coupled to the processing system and that includes instructions that, when executed by the processing system, cause the processing system to provide an Software Defined Networking (SDN) controller power management engine that is configured to: detect a plurality of Power Sourcing Equipment (PSE) networking devices; receive, from each of the plurality of PSE networking devices, a first SDN communication that includes Power over Ethernet (PoE) information for that PSE networking device; and generate a management graphical user interface that is configured to display any of the PoE information that was received in the first SDN communications from each of the plurality of PSE networking devices.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
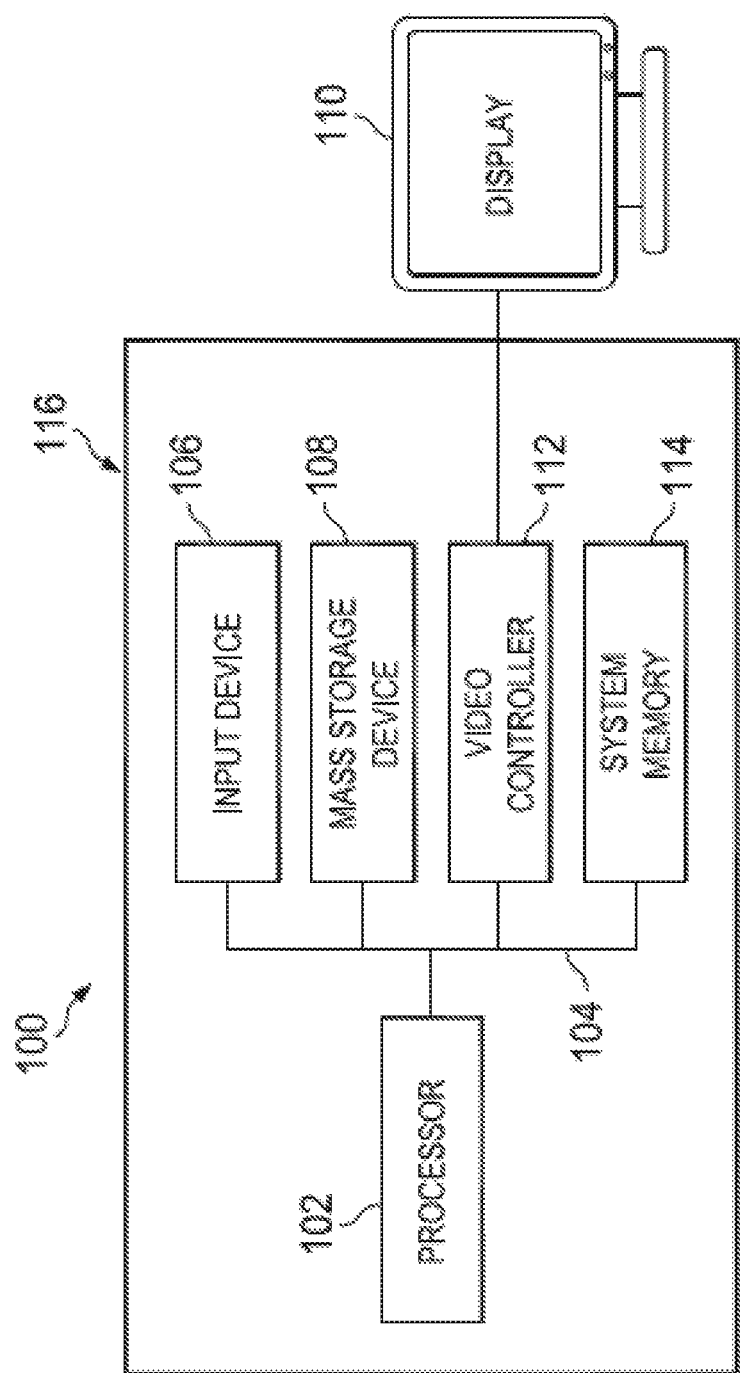
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
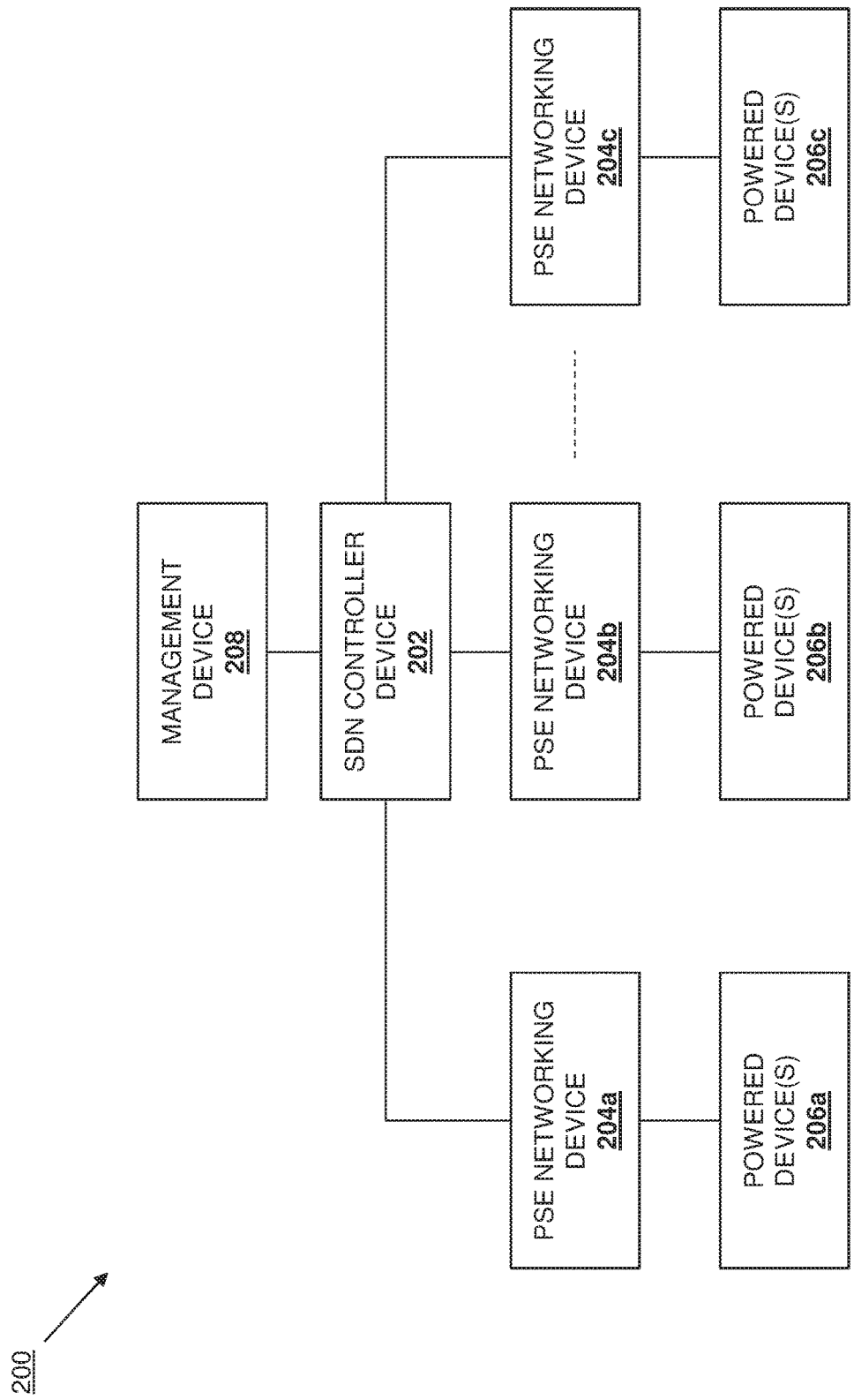
FIG. 2 is a schematic view illustrating an embodiment of an SDN controlled PoE management system.

Referring now to FIG. 2, an embodiment of a Software Defined Networking (SDN) controlled Power over Ethernet (PoE) management system 200 is illustrated. The SDN controlled PoE management system 200 includes an SDN controller device 202. In an embodiment, the SDN controller device 202 may be the IHS 100 discussed above with reference to FIG. 1, and/or may include some or all of the components of the IHS 100. In many of the specific embodiments discussed below, the SDN controller device 202 is provided by an OpenFlow controller that operates according to the Openflow protocol, although one of skill in the art in possession of the present disclosure will recognize that other SDN controllers operating according to other SDN protocols may fall within the scope of the present disclosure as well. The SDN controller device 202 is coupled to a plurality of Power Sourcing Equipment (PSE) networking devices 204a, 204, and up to 204c. In an embodiment, any or all of the PSE networking devices 204a-c may be the IHS discussed above with reference to FIG. 1, and/or may include some or all of the components of the IHS 100. In the specific embodiments discussed below, the PSE networking devices 204a-c are provided by OpenFlow switches that operate according to the OpenFlow protocol, although one of skill in the art in possession of the present disclosure will recognize that other networking devices operating according to other SDN protocols may fall within the scope of the present disclosure as well. Furthermore, one of skill in the art in possession of the present disclosure will recognize that the SDN controlled PoE management system 200 may include networking devices (not illustrated) that do not provide PoE and/or do not operate according to the OpenFlow (or other SDN) protocols as well. Furthermore, while only three PSE networking devices are illustrated, one of skill in the art in possession of the present disclosure will recognize that networks may (and typically will) include many more switches and/or PSE networking device (e.g., in the hundreds), and that such large networks will realize particular benefits from the teachings of the present disclosure.

Each of the PSE networking devices 204a-c may be coupled to one or more powered devices. For example, in the illustrated embodiment, the PSE networking device 204a is coupled to one or more powered devices 206a, the PSE networking device 204b is coupled to one or more powered devices 206b, and the PSE networking device 204c is coupled to one or more powered devices 206c. In an embodiment, any or all of the powered devices 206a-c may be the IHS 100 discussed above with reference to FIG. 1, and/or may include some or all of the components of the IHS 100. In specific embodiments, the powered devices 206a-c may be provided by wireless access points, IP cameras, and Voice over Internet Protocol (VoIP) phones, although one of skill in the art in possession of the present disclosure will recognize that virtually any powered device known in the art will fall within the scope of the present disclosure as well. In the illustrated embodiment, a management device 208 is coupled to the SDN controller device 202, and may be provided by the IHS 100 discussed above with reference to FIG. 1 and/or may include some or all of the components of the IHS 100. While the management device 208 is illustrated and described below as separate from the SDN controller device 202, in some embodiments the SDN controller device 202 and the management device 208 may be combined while remaining within the scope of the present disclosure. While a specific SDN controlled PoE management system has been illustrated and described, one of skill in the art in possession of the present disclosure will recognize that a wide variety different devices, device configurations, and other modifications to the SDN controlled PoE management system 200 will fall within the scope of the present disclosure.

Figure 3:
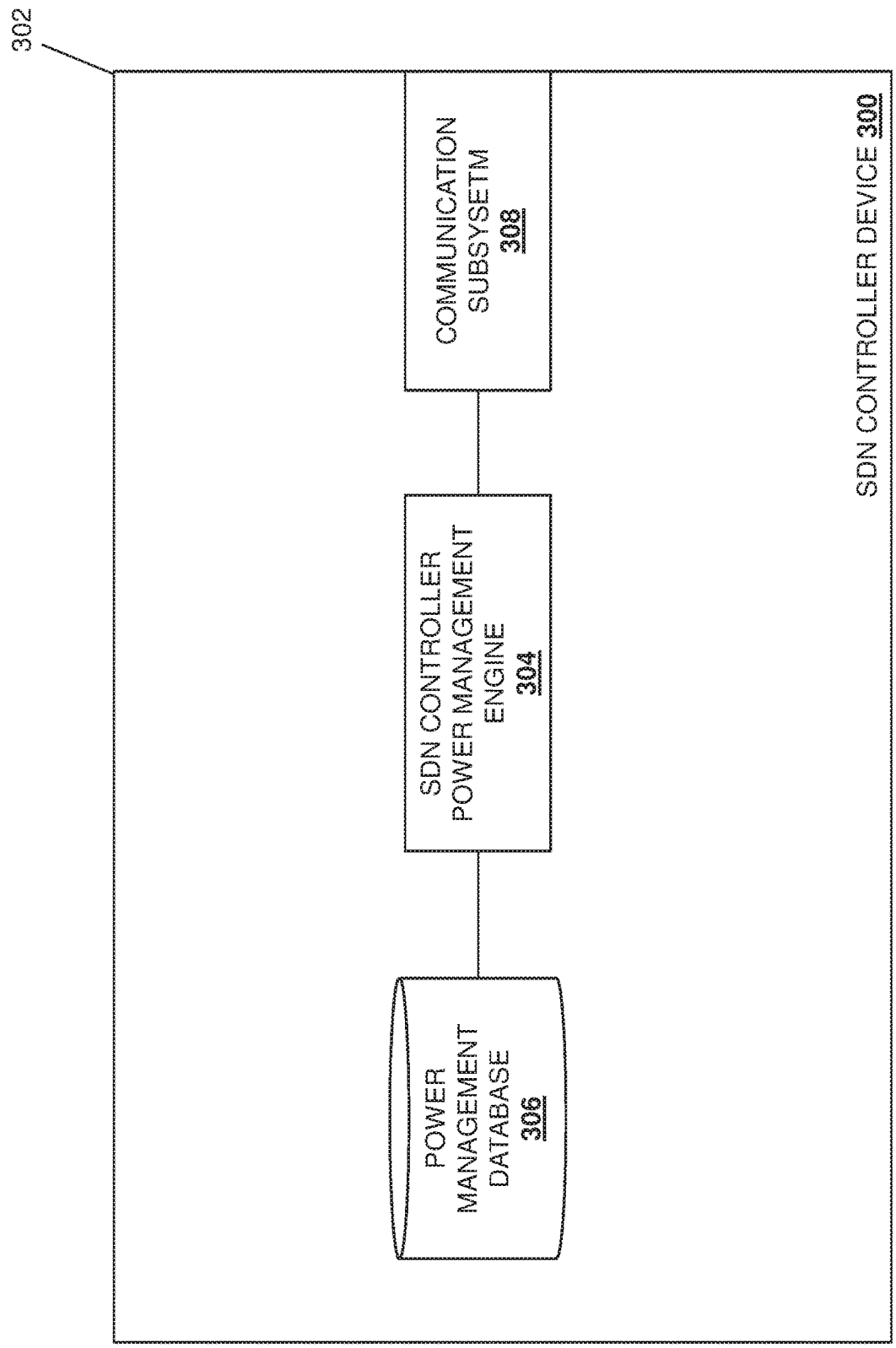
FIG. 3 is a schematic view illustrating an embodiment of an SDN controller device used in the SDN controlled PoE management system of FIG. 2.

Referring now to FIG. 3, an embodiment of an SDN controller device 300 is illustrated that may be the SDN controller device 202 discussed above with reference to FIG. 2. As such, the SDN controller device 300 may be the IHS 100 discussed above with reference to FIG. 1 and/or may include some or all of the components of the IHS 100, and in specific embodiments may be provided by an OpenFlow controller operating according to the OpenFlow protocol. In the illustrated embodiment, the SDN controller device 300 includes a chassis 302 that houses the components of the SDN controller devices 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide an SDN controller power management engine 304 that is configured to perform the functions of the SDN controller power management engines and SDN controller devices discussed below. In the examples provided below, the SDN controller power management engine 304 is described as providing conventional SDN engine functionality (e.g., OpenFlow protocol functionality), as well as PoE management functionality. However, an SDN engine (e.g., an OpenFlow engine) may be provided separate from, and along with, the SDN controller power management engine 304 (with each providing the functionality coordinated as discussed below) while remaining within the scope of the present disclosure.

The chassis 302 may also house a storage system (not illustrated, but which may include the storage device 108 discussed above with reference to FIG. 1) that is coupled to the SDN controller power management engine 304 (e.g., via a coupling between the storage system and the processing system) and that includes a power management database 306 that may store any of the information or other data generated and/or used to provide the functionality described below. The chassis 302 may also house a communication subsystem 308 that is coupled to the SDN controller power management engine 304 (e.g., via a coupling between the communication subsystem 308 and the processing system) and that may include a Network Interface Controller (NIC), a wireless communication device (e.g., a BLUETOOTH® device, a Near Field Communication (NFC) device, etc.), and/or other communication components known in the art. While a specific SDN controller device 300 has been illustrated and described, one of skill in the art in possession of the present disclosure will recognize that a wide variety of other components may be provided in the chassis 302 in order provide conventional SDN controller device functionality (e.g., conventional OpenFlow functionality), as well as the functionality discussed below, while remaining within the scope of the present disclosure.

Figure 4:
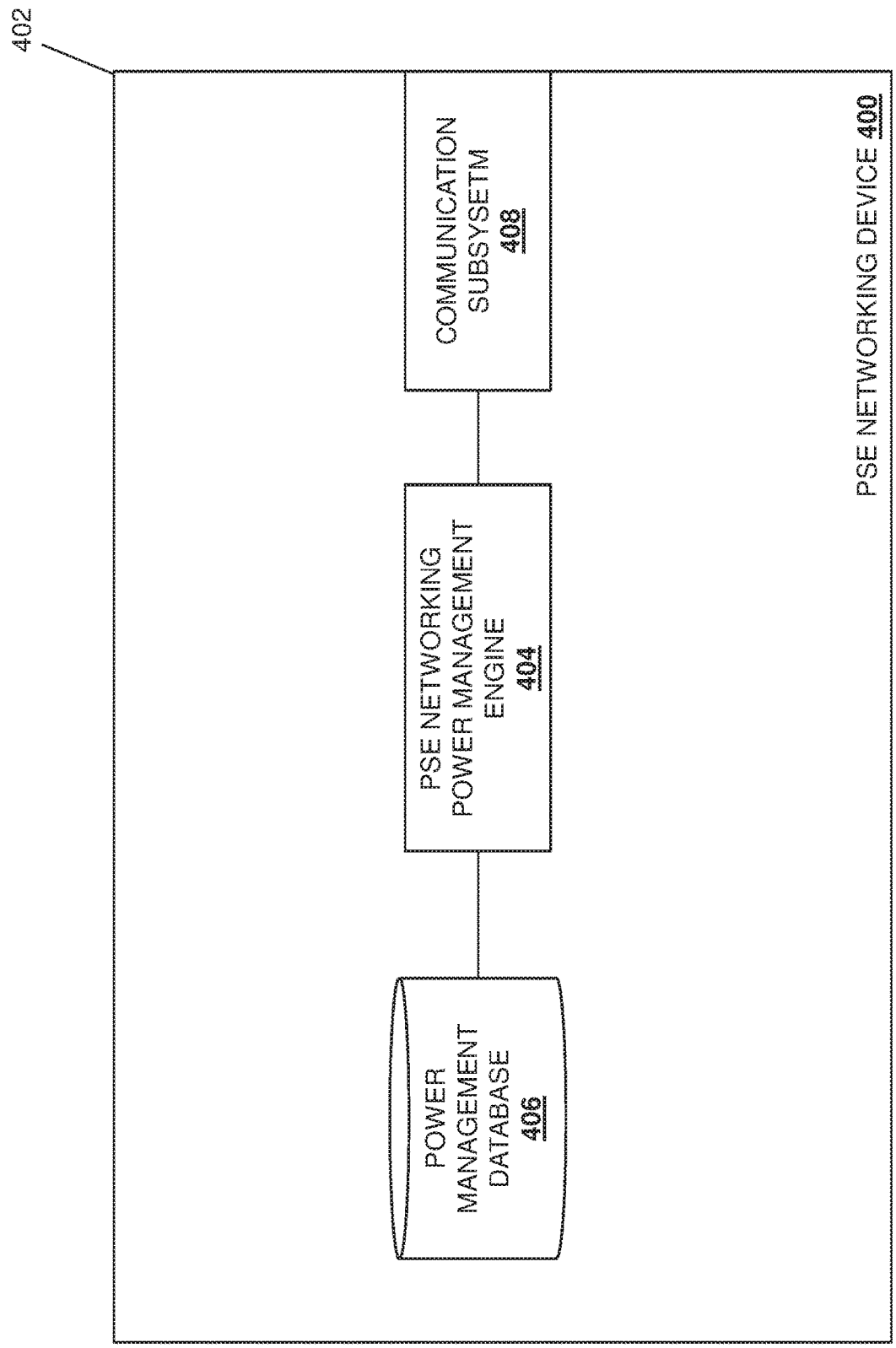
FIG. 4 is a schematic view illustrating an embodiment of a PSE networking device used in the SDN controlled PoE management system of FIG. 2.

Referring now to FIG. 4, an embodiment of a PSE networking device 400 is illustrated that may be any of the PSE networking devices 204a-c discussed above with reference to FIG. 2. As such, the PSE networking device 400 may be the IHS 100 discussed above with reference to FIG. 1 and/or may include some or all of the components of the IHS 100, and in specific embodiments may be provided by an OpenFlow switch operating according to the OpenFlow protocol. In the illustrated embodiment, the PSE networking device 400 includes a chassis 402 that houses the components of the PSE networking device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide an PSE networking power management engine 404 that is configured to perform the functions of the PSE networking power management engines and PSE networking devices discussed below.

The chassis 402 may also house a storage system (not illustrated, but which may include the storage device 108 discussed above with reference to FIG. 1) that is coupled to the PSE networking power management engine 404 (e.g., via a coupling between the storage system and the processing system) and that includes a power management database 406 that may store any of the information or other data generated and/or used to provide the functionality described below. The chassis 402 may also house a communication subsystem 408 that is coupled to the PSE networking power management engine 404 (e.g., via a coupling between the communication subsystem 408 and the processing system) and that may include a Network Interface Controller (NIC), a wireless communication device (e.g., a BLUETOOTH® device, a Near Field Communication (NFC) device, etc.), and/or other communication components known in the art. In particular, the communication subsystem 408 may be part of a PoE subsystem, and thus may include ports through which both data and electrical power may be provided via a network cable, as well as data and power subsystems for doing so. While a specific PSE networking device 400 has been illustrated and described, one of skill in the art in possession of the present disclosure will recognize that a wide variety of other components may be provided in the chassis 402 in order provide conventional PSE networking device functionality (e.g., conventional OpenFlow functionality), as well as the functionality discussed below, while remaining within the scope of the present disclosure.

Figure 5:
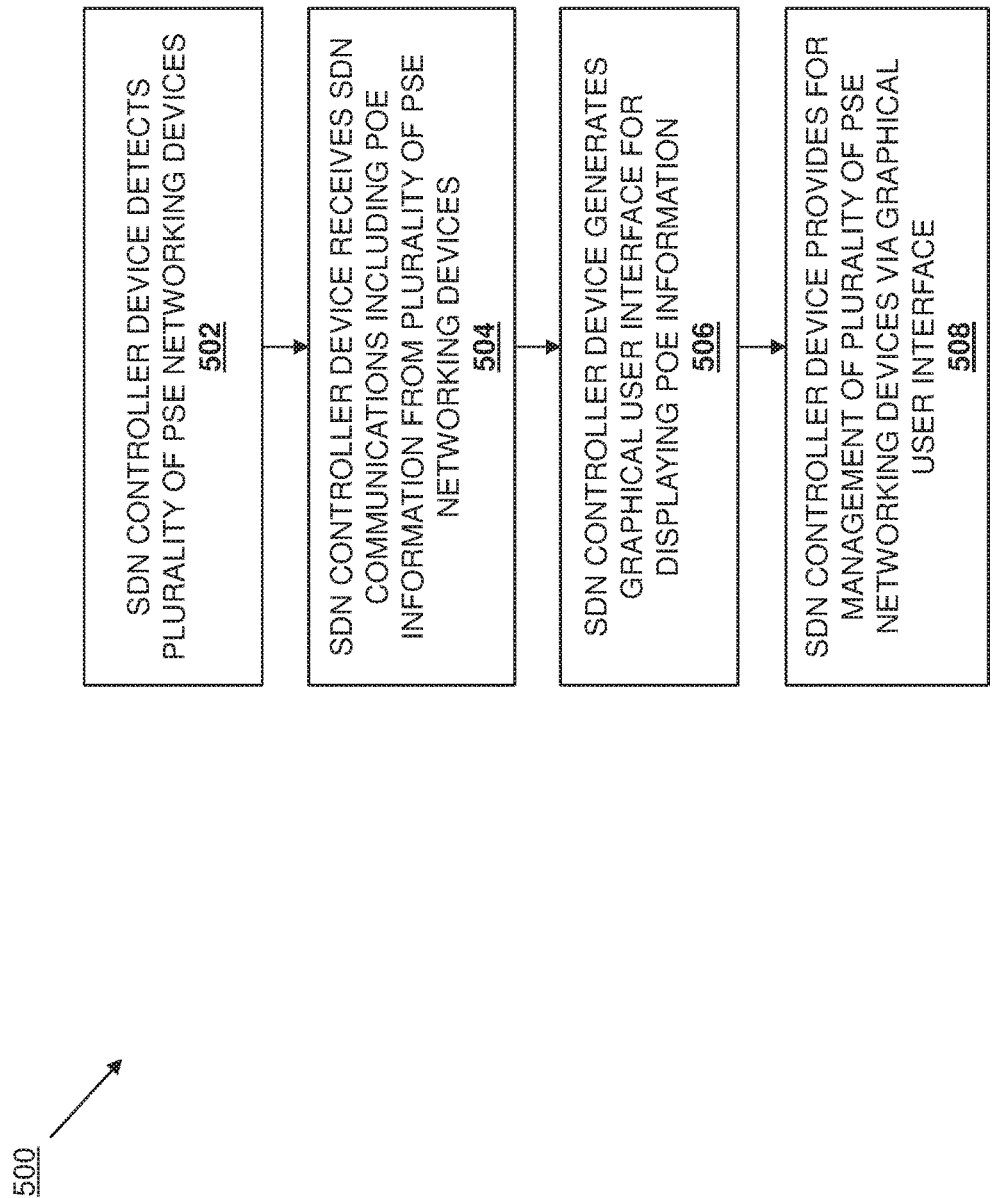
FIG. 5 is a flow chart illustrating an embodiment of a method for SDN controlled PoE management.

Referring now to FIG. 5, an embodiment of a method 500 for SDN controlled PoE management is illustrated. As discussed below, the systems and methods of the present disclosure provide a centralized approach to PoE network management using, for example, an SDN controller that probes a plurality of SDN switches for their PoE capability, as well as manages that PoE capability, using the OpenFlow protocol. As such, the SDN controller can determine a network topology, identify the PoE power available from each SDN switch, and provide management functionality that allows for the determination of particular SDN switches to which powered devices should be connected. Furthermore, the SDN controller may provide for the control of PoE capabilities on any of the SDN switches, the monitoring of PoE statistics for any or all of the SDN switches, the monitoring of powered devices connected to the SDN switches, and/or a variety of other PoE management functionality that would be apparent to one of skill in the art in possession of the present disclosure. As such, the PoE management systems and methods of the present disclosure provide substantial improvements on the conventional PoE management systems that are limited to the manual PoE management of individual PSE networking devices.

The method 500 begins at block 502 where an SDN controller device detects a plurality of PSE networking devices. In an embodiment, at block 502, the SDN controller power management engine 304 may operate to detect a network topology that includes the plurality of PSE networking devices 204a-c. For example, at block 502, the SDN controller power management engine 304 in the SDN controller device 202/300 and/or the PSE networking power management engine 404 in the PSE networking devices 204a-c/400 may utilize the OpenFlow Discovery Protocol (OFDP) to provide for a network topology discovery. As would be understood by one of skill in the art in possession of the present disclosure, the performance of a network topology discovery using the OFDP includes the utilization of the Link Layer Discovery Protocol (LLDP) (with some modifications) to perform topology discovery in an Openflow network. For example, OFDP advertisements (an artificial term used to differentiate them from non-modified LLDP advertisements) may be provided from the PSE networking devices 204a-c as LLDP advertisements that have been modified with a multicast address that provides for their forwarding by other networking devices in the network so that they may be received by the SDN controller device 202 (as well as other PSE networking devices). Thus, at block 502, PSE networking power management engine 404 in the PSE networking devices 204a-c/400 may send OFDP advertisements (e.g., via the communication subsystem 408) that are received the SDN controller power management engine 304 in the SDN controller device 300 (e.g., via the communication subsystem 308), and the SDN controller power management engine 304 may detect the plurality of PSE networking devices 204a-c via the OFDP advertisements and/or determine the network topology that includes the PSE networking devices 204a-c. However, one of skill in the art in possession of the present disclosure will recognize that other network topology determination methods may fall within the scope of the present disclosure as well.

Figure 6:
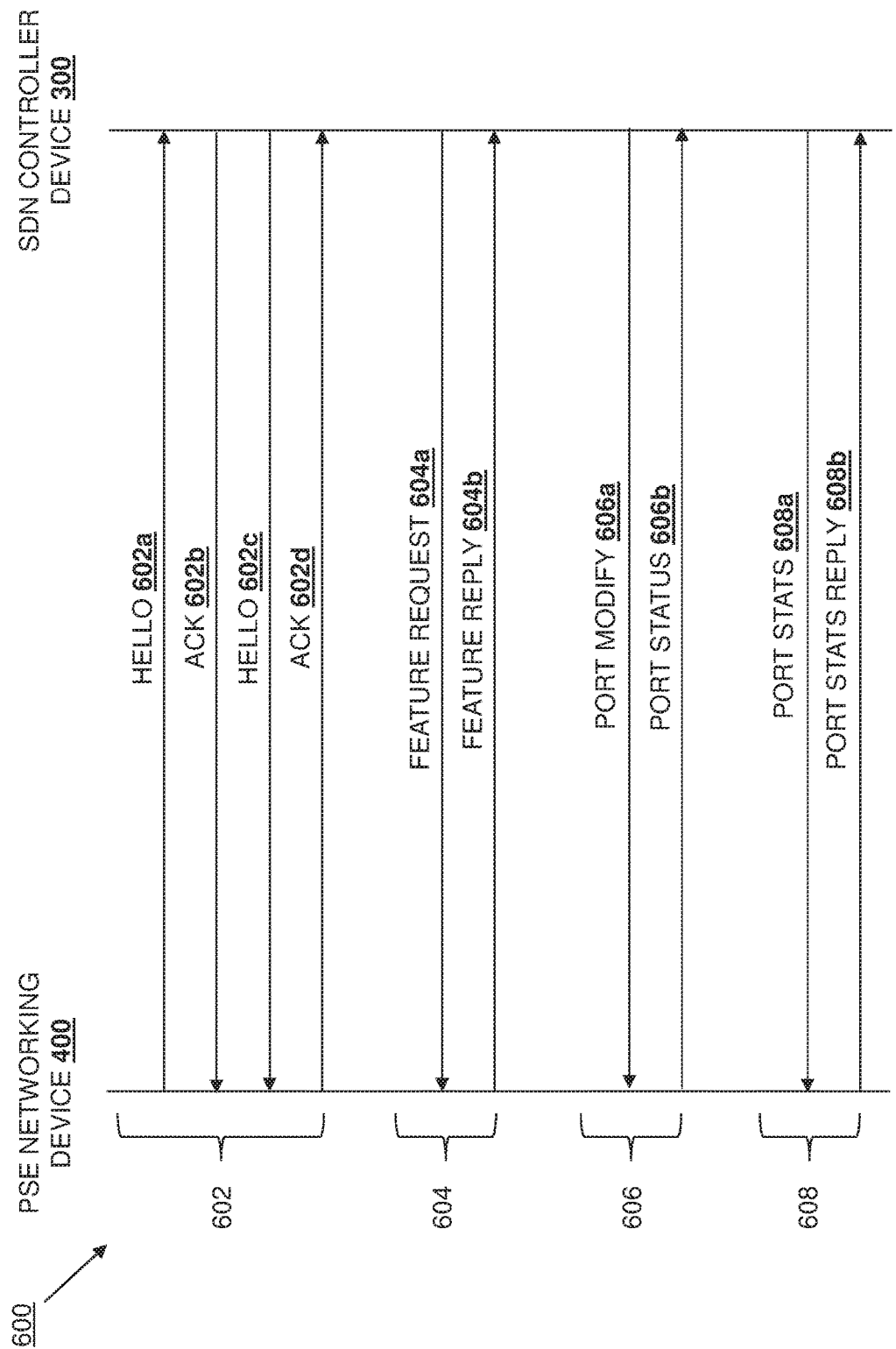
FIG. 6 is a swim lane diagram illustrating an embodiment of communications between the SDN controller device of FIG. 3 and the PSE networking device of FIG. 4 during the method of FIG. 5.

With reference to the swim lane diagram 600 in FIG. 6, an initial communication exchange 602 is illustrated that may be performed prior to the network topology discovery at block 502 in order to, for example, exchange the SDN protocol version (e.g., the OpenFlow protocol version) supported by the PSE networking devices and the SDN controller device. As can be seen, the initial communication exchange 602 may include the PSE networking power management engine 404 in any of the PSE networking devices 202/400 sending a hello message 602a (e.g., via the communication subsystem 408) that is received by the SDN controller power management engine 304 in the SDN controller device 202/300 (e.g., via the communication subsystem 308), and the SDN controller power management engine 304 in the SDN controller device 202/300 replying with an acknowledge message 602b (e.g., via the communication subsystem 308) that is received by the PSE networking power management engine 404 in any of the PSE networking devices 204a-c/400 (e.g., via the communication subsystem 408). Furthermore, the initial communication exchange 602 may also include the SDN controller power management engine 304 in the SDN controller device 202/300 sending a hello message 602c (e.g., via the communication subsystem 308) that is received by the PSE networking power management engine 404 in any of the PSE networking devices 204a-c/400 (e.g., via the communication subsystem 408), and the PSE networking power management engine 404 in any of the PSE networking devices 204a-c/400 replying with an acknowledge message 602d (e.g., via the communication subsystem 408) that is received by the SDN controller power management engine 304 in the SDN controller device 202/300 (e.g., via the communication subsystem 308). As such, in some embodiments, the SDN controller device 202 may access each of the PSE networking devices 204a-c, eliminating the manual CLI log in and access actions that must be performed manually with individual PSE networking device by a user in conventional PoE management systems.

The method 500 then proceeds to block 504 where the SDN controller device receives SDN communications that include PoE information from the plurality of PSE networking devices. In an embodiment, at block 504, the SDN controller power management engine 304 in the SDN controller device 202/400 may receive SDN communications (e.g., via the communication subsystem 308) that include PoE information and that were sent from the PSE networking power management engine 404 in any of the PSE networking devices 204a-c/400 (e.g., via the communication subsystem 408). As described in the different embodiments below, the SDN communications received by the SDN controller power management engine 304 from the PSE networking power management engine 404 may be sent by the PSE networking power management engine 404 in response a request or other communication received from the SDN controller power management engine 304. However, the provisioning of SDN communications by the PSE networking power management engine 404 to the SDN controller power management engine 304 as per block 504 may occur in a variety of manners (e.g., without a request) that would be apparent to one of skill in the art in possession of the present disclosure.

With reference to the swim lane diagram 600 in FIG. 6, a feature communication exchange 604 is illustrated that may occur at block 504, and which in some embodiments may be performed immediately following the initial communication exchange 602. As can be seen, the feature communication exchange 604 may include the SDN controller power management engine 304 in the SDN controller device 202/300 sending a feature request message 604a (e.g., via the communication subsystem 308) that is received by the PSE networking power management engine 404 in any of the PSE networking devices 204a-c/400 (e.g., via the communication subsystem 408), and the PSE networking power management engine 404 in any of the PSE networking devices 204a-c/400 replying with a feature reply message 604b (e.g., via the communication subsystem 408) that is received by the SDN controller power management engine 304 in the SDN controller device 300 (e.g., via the communication subsystem 308). In a specific example, the SDN controller power management engine 304 may send the feature request message 604a at block 504 as an OpenFlow protocol feature request message that may include a variety OpenFlow protocol feature request message characteristics that would be apparent to one of skill in the art in possession of the present disclosure. In response to the feature request message 604a, the PSE networking power management engine 404 may reply with a modified Openflow protocol feature reply message that may include the following OpenFlow code:

```
/*Capabilities supported by the datapath*/
Enum ofp_capabiliteis {
  OFPC_FLOW_STATS        = 1 << 0, /*Flow statistics.*/
  OFPC_TABLE_STATS       = 1 << 1, /*Flow statistics.*/
  OFPC_PORT_STATS        = 1 << 2, /*Port statistics.*/
  OFPC_GROUP_STATS       = 1 << 3, /*Group statistics.*/
  OFPC_IP_REASM          = 1 << 5, /*Can reassemble IP
                                     fragments.*/
  OFPC_QUEUE_STATS       = 1 << 6, /*Queue statistics.*/
  OFPC_PORT_BLOCKED      = 1 << 8, /*Switch will block looping
                                     ports.*/
  OFPC_PORT_POE_CAPABLE  = 1 << 9, /*Switch will support
                                     PoE.*/
}.
```

One of skill in the art in possession of the present disclosure will recognize that the portion of the OpenFlow code above, "OFPC_PORT_POE_CAPABLE=1<<9, /*Switch will support PoE.*/", includes PoE information for the PSE networking device 204a-c that provided the OpenFlow feature reply message 604b, and provides a modification to conventional OpenFlow protocol feature reply messages in order to provide for the functionality discussed below. For example, the portion "OFPC_PORT_POE_CAPABLE=1<<0, /*Switch will support PoE.*/" of the OpenFlow code above provides PoE information about the PSE networking device 400 to the SDN controller device 300 that indicates that the PSE networking device 400 is a PoE capable networking device. However, other SDN protocols providing other types of feature reply messages will fall within the scope of the present disclosure as well.

Referring back to the swim lane diagram 600 in FIG. 6, a port modification communication exchange 606 is illustrated that may occur at block 504, and which in some embodiments may be performed following the feature communication exchange 604. As can be seen, the port modification communication exchange 606 may include the SDN controller power management engine 304 in the SDN controller device 202/300 sending a port modify message 606a (e.g., via the communication subsystem 308) that is received by the PSE networking power management engine 404 in any of the PSE networking devices 204a-c/400 (e.g., via the communication subsystem 408), and the PSE networking power management engine 404 in any of the PSE networking devices 204a-c/400 replying with a port status message 606b (e.g., via the communication subsystem 408) that is received by the SDN controller power management engine 304 in the SDN controller device 300 (e.g., via the communication subsystem 308). In a specific example, the SDN controller power management engine 304 may send the port modify message 606a at block 504 as an OpenFlow port modify message that may include the following OpenFlow code:

modify messages in order to provide for the functionality discussed below. For example, the portion "PORT_CONFIG_POE_DISABLE=1<<7, /<**Port is administratively POE disabled.*/" of the OpenFlow code above, as well as the PoE port features detailed in the Existing features portion of the OpenFlow code above, include PoE information provided for the PSE networking device 204a-c by the SDN controller device 202 that indicates the PoE status and PoE properties that may be set for a port in the PSE networking device. However, other SDN protocols providing other types of port modify messages will fall within the scope of the present disclosure as well.

One of skill in the art in possession of the present disclosure will recognize that the port modify message 606a provided above by the SDN controller device 202 enables the control of PoE port functionality from a centralized location by providing for the enablement, disablement, and/or other modification of any PoE-capable port on the PSE networking devices 204a-c. Furthermore, such PoE port modification functionality may be leveraged by the SDN controller power management engine 304 in identifying PoE ports on a PSE networking device that are not being utilized (e.g., via the port statistics communication exchange 608, discussed below) due to no powered device being connected to that PoE port, a malfunctioning powered device being connected to that PoE port, etc., and then disabling that PoE port in order to conserve or reallocate power.

```
Typedef enum
{
PORT_CONFIG_DOWN            = 1 << 0, /**<Port is administratively down.*/
PORT_NO_RECV                = 1 << 2, /**<Drop all packets received by port.*/
PORT_NO_FWD                 = 1 << 5, /<**Drop packets forwarded to port.*/
PORT_NO_PACKET_IN           = 1 << 6, /,**Do not send packet-in messages for port.*/
PORT_CONFIG_POE_DISABLE     = 1 << 7, /<**Port is administratively POE disabled.*/
}PORT_CONFIG_t;
/**Features of ports available in a datapath.*/
typedef enum
{
/**10 Mb half-duplex rate support.*/
PORT_FEAT_10MB_HD = 1 << 0,
............................................................
................Existing features...............
/**PoE +.*/
PORT_FEAT_POE_HIGH                          = 1 << 16,
/**PoE Management Class*/
PORT_FEAT_POE_MANAGEMENT_CLASS              = 1 << 17,
/**PoE Management Static*/
PORT_FEAT_POE_MANAGEMENT_STATIC             = 1 << 18,
/**PoE Management Dynamic*/
PORT_FEAT_POE_MANAGEMENT_DYNAMIC            = 1 << 19,
/**PoE Priority Low*/
PORT_FEAT_POE_PRIORITY_LOW                  = 1 <<20,
/**PoE Priority High*/
PORT_FEAT_POE_PRIORITY_HIGH                 = 1 << 21,
/**PoE Priority Critical*/
PORT_FEAT_POE_PRIORITY_CRITICAL             = 1 << 22,
} PORT_FEATURE_t
```

One of skill in the art in possession of the present disclosure will recognize that the portion of the OpenFlow code above, "PORT_CONFIG_POE_DISABLE=1<<7, /<**Port is administratively POE disabled.*/", as well as the PoE port features detailed in the Existing features portion of the OpenFlow code above (e.g., PoE+, PoE Management Class, PoE Management Static, PoE Management Dynamic, PoE Priority Low, PoE Priority High, and PoE Priority Critical), include PoE information provided for the PSE networking device 204a-c by the SDN controller device 202 via the OpenFlow port modify message 606a, and provides a modification to conventional OpenFlow protocol port In response to the port modify message 606a, the PSE networking power management engine 404 may send the port status message 606b at block 504 as an OpenFlow port status message that may include the following OpenFlow code:

```
Typedef enum
{
PORT_STATE_LINK_DOWN    = 1 << 0, /**<No physical link
                                    present.*/
PORT_STATE_BLOCKED      = 1 << 1, /**<Port is blocked.*/
```

-continued

```
PORT_STATE _LIVE            = 1 << 2, /<**Live for Fast Failover
                              Group.*/
PORT_STATE_POE _DISABLE     = 1 << 3, /**PoE Enable or Disable*/
} PORT_FEATURE_t
```

One of skill in the art in possession of the present disclosure will recognize that the portion of the OpenFlow code above, "PORT_STATE_POE_DISABLE=1<<3, /**PoE Enable or Disable*/", includes PoE information for the PSE networking device 204*a-c* that provided the OpenFlow port status message 606*b*, and provides a modification to conventional OpenFlow protocol port status messages in order to provide for the functionality discussed below. For example, the portion "PORT_STATE_POE_DISABLE=1<<3, /**PoE Enable or Disable*/" of the OpenFlow code above provides PoE information about the PSE networking device 400 to the SDN controller device 300 that indicates whether the PoE functionality of a PoE capable port on the PSE networking device is enabled or disabled. However, other SDN protocols providing other types of port status messages will fall within the scope of the present disclosure as well. As such, the SDN controller device 202 enables the monitoring of PoE port functionality (e.g., the PoE port status received in the port status message 606*b*), and such port modification communication exchanges (or similar communication exchanges) may be leveraged for the monitoring of powered devices (e.g., classes of powered devices, power consumption of powered devices, etc.) that are connected to the PSE networking devices 204*a-c* and that may have communicated that PoE information to the PSE networking devices via LLDP, from a centralized location.

Referring back to the swim lane diagram 600 in FIG. 6, a port statistics communication exchange 608 is illustrated that may occur at block 504, and which in some embodiments may be performed following the port modification communication exchange 606. As can be seen, the port statistics communication exchange 608 may include the SDN controller power management engine 304 in the SDN controller device 202/300 sending a port stats message 608*a* (e.g., via the communication subsystem 308) that is received by the PSE networking power management engine 404 in any of the PSE networking devices 204*a-c*/400 (e.g., via the communication subsystem 408), and the PSE networking power management engine 404 in any of the PSE networking devices 204*a-c*/400 replying with a port stats reply message 608*b* (e.g., via the communication subsystem 408) that is received by the SDN controller power management engine 304 in the SDN controller device 300 (e.g., via the communication subsystem 308). In a specific example, the SDN controller power management engine 304 may send the port stats message 608*a* at block 504 as an OpenFlow port stats message that may include the following OpenFlow code:

```
enum ofp_multipart_type {
    OFPMP_DESC                              = 0,
    OFPMP_FLOW                              = 1,
    OFPMP_AGGREGATE                         = 2,
    OFPMP_TABLE                             = 3
    ...............................................Existing
    OFPMP_PORT_DESC                         = 13,
    OFPMP_PORT_POE _STATS                   = 14,
}
```

Reply will be a list of below poe stats

One of skill in the art in possession of the present disclosure will recognize that the portion of the OpenFlow code above, "OFPMP_PORT_POE_STATS=14,", includes PoE information provided for the PSE networking device 204*a-c* by the SDN controller device 202 via the OpenFlow port stats message 608*a*, and provides a modification to conventional OpenFlow protocol port stats messages in order to provide for the functionality discussed below. For example, the portion "OFPMP_PORT_POE_STATS=14," of the OpenFlow code above includes PoE information provided for the PSE networking device 204*a-c* by the SDN controller device 202 that includes a request by the SDN controller device to the PSE networking device to send PoE information about its port(s). However, other SDN protocols providing other types of port stats messages will fall within the scope of the present disclosure as well.

In response to the port stats message 608*a*, the PSE networking power management engine 404 may send the port stats reply message 608*b* at block 504 as an OpenFlow port stats reply message that may include the following OpenFlow code:

```
enumpower_priority {
    PRIORITY_INVALID         = -1,
    PRIORITY_CRITICAL        = 0x01,
    PRIORITY_HIGH            = 0x02,
    PRIORITY_LOW             = 0X03
};
enumpm_mode {
    PM_INVALID               = -1,
    PM_STATIC                = 0,
    PM_DYNAMIC               = 1,
    PM_CLASS                 = 2
};
Enumpoepowerclass {
    POWER_INVALID            = 0
    POWER_CLASS0,
    POWER_CLASS1,
    POWER_CLASS2,
    POWER_CLASS3,
    POWER_CLASS4
};
enumpoedetectstatus {
    POE_DETECT_INVLID                = -1,
    POE_DETECT_DISABLED              = 0,
    POE_DETECT_SEARCHING,
    POE_DETECT_DELVIERING_POWER,
    POE_DETECT_TEST,
    POE_DETECT_FAULT,
    POE_DETECT_OTHER_FAULT,
    POE_DETECT_REQUESTING_POWER,
    POE_DETECT_OVERLOAD
};
enumpoeportfaultstatus {
    POE_FAULT_NONE           = 0,
    POE_FAULT_MPS_ABSENT,
    POE_FAULT_SHORT,
    POE_FAULT_OVERLOAD,
    POE_FAULT_POWER_DENIED,
    POE_FAULT_THERMAL_SHUTDOWN,
    POE_FAULT_STARTUP_FAILURE
};
struct ofp_poe_port_stats {
    float poe_power;
    poe_type type;
    poedetectstatus detectionStatus;
    poeportfaultstatus errorCode;
    poepowerclass powerClass;
    unsigned int invalidSignature;
    unsigned int powerDenied;
    unsigned int shortCounter;
    unsigned int overload;
    unsigned int mpsAbsent;
}
```

```
enumpoe_type {
    OFT_POE_LEGACY              = 0,
    OFP_POE_802.3AF             = 1,
    OFP_POE_802.3AFAT           = 2,
    OFP_POE_DISABLED            = 3,
    OFP_POE_PORT_DETECTING      = 4,
    OFT_POE_PORT_FAULTED        = 5,
    OFP_POE_PORT_FORCED_ON      = 6,
    OFP_POE_PORT_INVALID        = 7
}
```

One of skill in the art in possession of the present disclosure will recognize that the OpenFlow code above includes PoE information for the PSE networking device 204a-c that provided the OpenFlow port stats reply message 608b, and provides a modification to conventional OpenFlow protocol port stats reply messages in order to provide for the functionality discussed below. For example, the OpenFlow code above provides PoE information about the PSE networking device 400 to the SDN controller device 300 that includes an update to the SDN controller device of the PoE statistics (e.g., power consumption, port priorities, etc.) for the PSE networking device. However, other SDN protocols providing other types of port status messages will fall within the scope of the present disclosure as well. As such, PoE power utilization statistics may be received by the SDN controller device 202 in a centralized manner from each of the PSE networking devices 204a-c, eliminating the need for the manual CLI log in and PoE statistic retrieval from each PSE networking device in a network as is required in conventional PoE managements systems.

While the SDN communications including PoE information (e.g., the feature communication exchange 604, the port modification communication exchange 606, and the port statistics communication exchange 608) have been described as occurring at block 504, one of skill in the art in possession of the present disclosure will recognize that the SDN communications described above may performed throughout the method 500 in order to provide for PoE management on any of the PSE networking devices 204a-c. For example, feature communication exchanges may be performed at any time during the method 500 to identify and update the centralized knowledge of PoE port features available on the PSE networking devices 204a-c, port modification communication exchanges may be performed at any time during the method 500 to centrally modify PoE port functions and report back on such modifications, and port statistic communication exchanges may be performed any time during the method 500 to retrieve, centrally store, and/or analyze PoE port statistics. Furthermore, any other PoE information generated by the operation of a PSE networking device and/or powered device may be retrieved similarly as described above, and the use of that PoE information for PoE management of any or all of the PSE networking devices 204a-c will fall within the scope of the present disclosure as well. For example, any of the PSE networking devices 204a-c may publish SDN notifications (e.g., OpenFlow notifications related to a PoE port "coming up" due to a powered device being connected to that PoE port) that may then be received by the SDN controller device 202 and used to update the power management database 306 that may store the centralized PoE information for all of the PSE networking devices and/or powered devices in the network.

In the embodiments discussed below, the management device 208 is configured to display a management graphical user interface that utilizes the network topology and PoE information discussed above to provide for PoE management of the PSE networking devices 204a-c. However, the management graphical user interface discussed below is provided as merely one example of how the PoE information may be centrally utilized to provide for PoE management of the PSE networking devices 204a-c, and other subsystems for providing PoE management will fall into the scope of the present disclosure as well. For example, rather than having a user make decisions about PoE management using PoE information displayed via the management graphical user interface as illustrated and described below, as well as provide instructions for PoE management via the management graphical user interface as illustrated and described below, other embodiments of the present disclosure may provide for substantially automated PoE management of the PSE networking devices 204a-c. As such, a user or administrator may define PoE management rules (or accept default rules), and the SDN controller power management engine 304 and PSE networking power management engines 404 may operate to enforce those rules to automate any of the functionality discussed below. Thus, one of skill in the art in possession of the present disclosure will recognize how a wide variety of automated PoE management techniques may be implemented using the SDN controller PoE management system 200 while remaining within the scope of the present disclosure.

For example, the SDN controller device 202 may utilize the network topology determined at block 502, and the PoE information retrieved at block 504, to identify, enable, and/or modify configuration of the PSE networking devices 204a-c (e.g., identify PoE ports, enable or disable PoE ports, modify the operation of PoE ports, etc.), monitor events in the PSE networking devices 204a-c (e.g., the connection or removal of powered devices, requests for different power amounts from PoE devices, alerts about power available to PSE networking devices, etc.), and then adjust the configuration of the PSE networking devices 204a-c and/or the powered devices (e.g., enable or disable PoE ports, adjust power available to PoE ports, reprioritize powered devices, etc.) in order to ensure that PoE is provided in the network in an optimal, efficient, or otherwise desired manner. As such, PoE events occurring anywhere in the network may be recognized centrally and addressed, either in an automated manner or by a user monitoring those events from a central management device that receives information from the SDN controller device.

Figure 7:
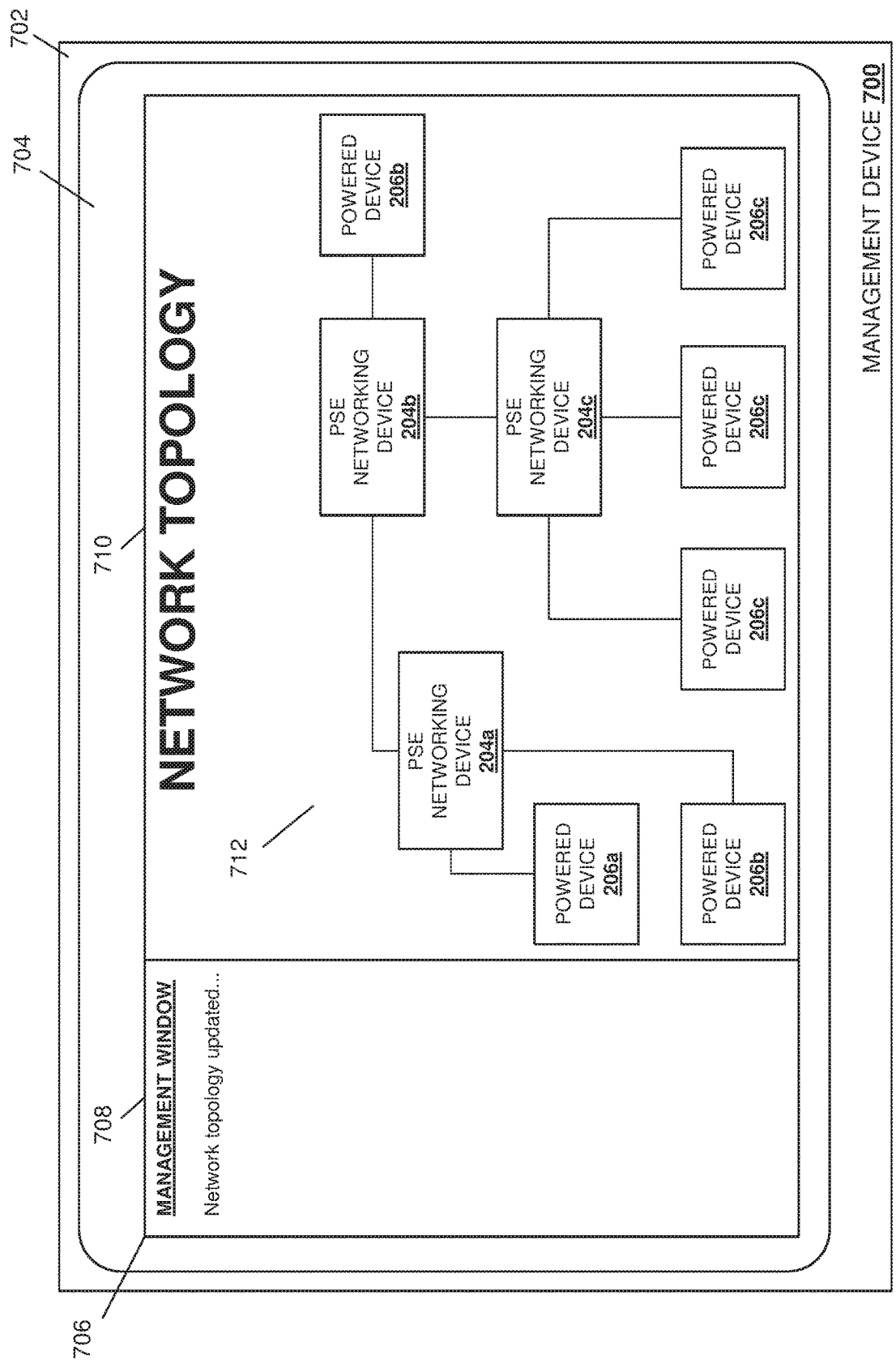
FIG. 7 is a screen shot illustrating an embodiment of a management graphical user interface that may be provided during the method of FIG. 5.

The method 500 then proceeds to block 506 where the SDN controller device generates a management graphical user interface for displaying the PoE information. In an embodiment, at block 506, the SDN controller power management engine 304 on the SDN controller device 202/300 may operate to provide (e.g., via the communication subsystem 308) a management graphical user interface for display on the management device 208. For example, FIG. 7 illustrates a management device 700, which may be the management device 208, that includes a chassis 702 having a display device 704 that is displaying a management graphical user interface 706. In the illustrated embodiment, the management graphical user interface 706 includes a management window 708 and a network topology section 710, although a variety of graphical user interface features are envisioned as falling within the scope of the present disclosure.

In a specific example, at block 506, the management graphical user interface 706 may provide for viewing of a network topology that includes PSE networking devices, powered devices, and the connections between them. For example, at block 504, the PoE information that is received may include PoE capabilities of the PSE networking devices 204*a-c*, as well as PoE information about the powered devices connected to each PSE networking device 204*a-c* (e.g., communicated between the PSE networking devices 204*a-c* and their powered devices 206*a-c* using LLDP and/or other techniques known in the art). As such, at block 506, the network topology section 710 of the management graphical user interface 706 may display a network topology 712 that includes identifiers for each of the PSE networking devices 204*a-c* and their powered devices 206*a-c* (e.g., provided by boxes in FIG. 7), as well as the connections between each of the PSE networking devices 204*a-c* and their powered devices 206*a-c* (e.g., provided by lines between the boxes). While a specific network topology 712 is illustrated, one of skill in the art in possession of the present disclosure will recognize that network topology will typically include many more devices than are illustrated in FIG. 7, and thus features for moving around such a large topology (e.g., "zooming", "unzooming", scrolling, etc.) may be provided by the management graphical user interface 706 while remaining within the scope of the present disclosure.

Continuing with the management graphical user interface 706 discussed above, in another specific example, at block 506 the management graphical user interface 706 may provide for viewing of PoE information about any of the PSE networking devices, powered devices, and/or the connections between them. For example, at block 504, the PoE information that is received may include PoE usage statistics for the PSE networking devices 204*a-c*, as well as PoE usage statistics for the powered devices connected to each PSE networking device 204*a-c* (e.g., communicated between the PSE networking devices 204*a-c* and their powered devices 206*a-c* using LLDP, determined based on the PoE usage statistics for the PSE networking device connected to that powered device, and/or using other techniques known in the art). As such, at block 506, the user of the management device 700 may use the network topology section 710 of the management graphical user interface 706 to select an identifier for a PSE networking device, a powered device, or a connection between a PSE networking device(s) and/or powered device(s), and have associated PoE information displayed.

Figure 8:
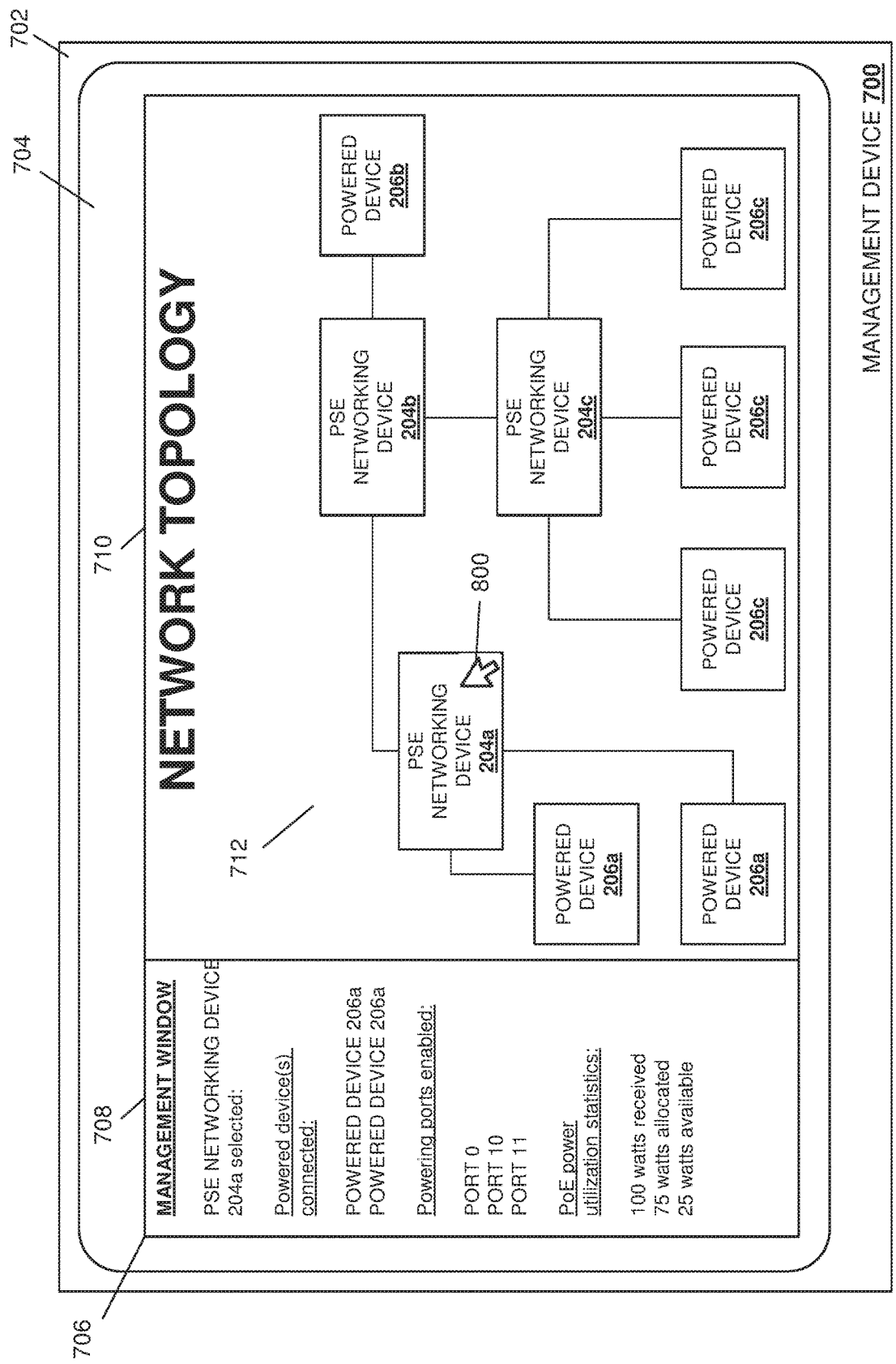
FIG. 8 is a screen shot illustrating an embodiment of a management graphical user interface that may be provided during the method of FIG. 5.

For example, in FIG. 8, a user has used a cursor 800 to select the identifier in the network topology 712 for the PSE networking device 204*a*, and in response the management window 708 is displaying PoE information for the PSE networking device 204*a*. In the illustrated embodiment, that PoE information indicates that the PSE networking device 204*a* is selected, is connected to two powered devices 206*a* and 206*b*, has three powering ports enabled (e.g., "PORTS 0, 10, AND 11"), is receiving 100 watts of PoE power, has allocated 75 watts of that PoE power, and has 25 watts of PoE power available. While a specific example is provided, one of skill in the art in possession of the present disclosure will recognize that any PoE information received from a PSE networking device, or determinable from PoE information received from a PSE networking device, may be displayed in a similar manner. Furthermore, a user may select any of the identifiers in the network topology 712 for the powered devices in order to have similar PoE information displayed (e.g., PoE power utilization on the powered device, PoE port enablement on the powered device, etc.), or select any of the identifiers in the network topology 712 for the connections between the PSE networking devices in order to have similar PoE information displayed (e.g., PoE power transmittal on the connection, PoE ports connected by the connection, etc.). Further still, rather than requiring the selection of a particular PSE networking device, powered device, or connection in order to provide for the display of PoE information, some PoE information may be displayed on the network topology 712 without instruction (e.g., the PoE power available from any PSE networking device may be displayed along with the identifier for that PSE networking device in the network topology 712.) As such, one of skill in the art in possession of the present disclosure will recognize that a variety of methods for displaying PoE information on the management graphical user interface 706 will fall within the scope of the present disclosure.

The method 500 then proceeds to block 508 where the SDN controller device receives provides for the management of the plurality of PSE networking devices via the graphical user interface. In an embodiment, at block 508, the SDN controller power management engine 304 on the SDN controller device 202/300 may receive (e.g., via the communication subsystem 308) a management request or other instructions from the management device 208 (e.g., via the management graphical user interface 712), and/or PoE information from a PSE networking device, and, in response, provide for the management of at least one of the PSE networking devices.

Figure 9:
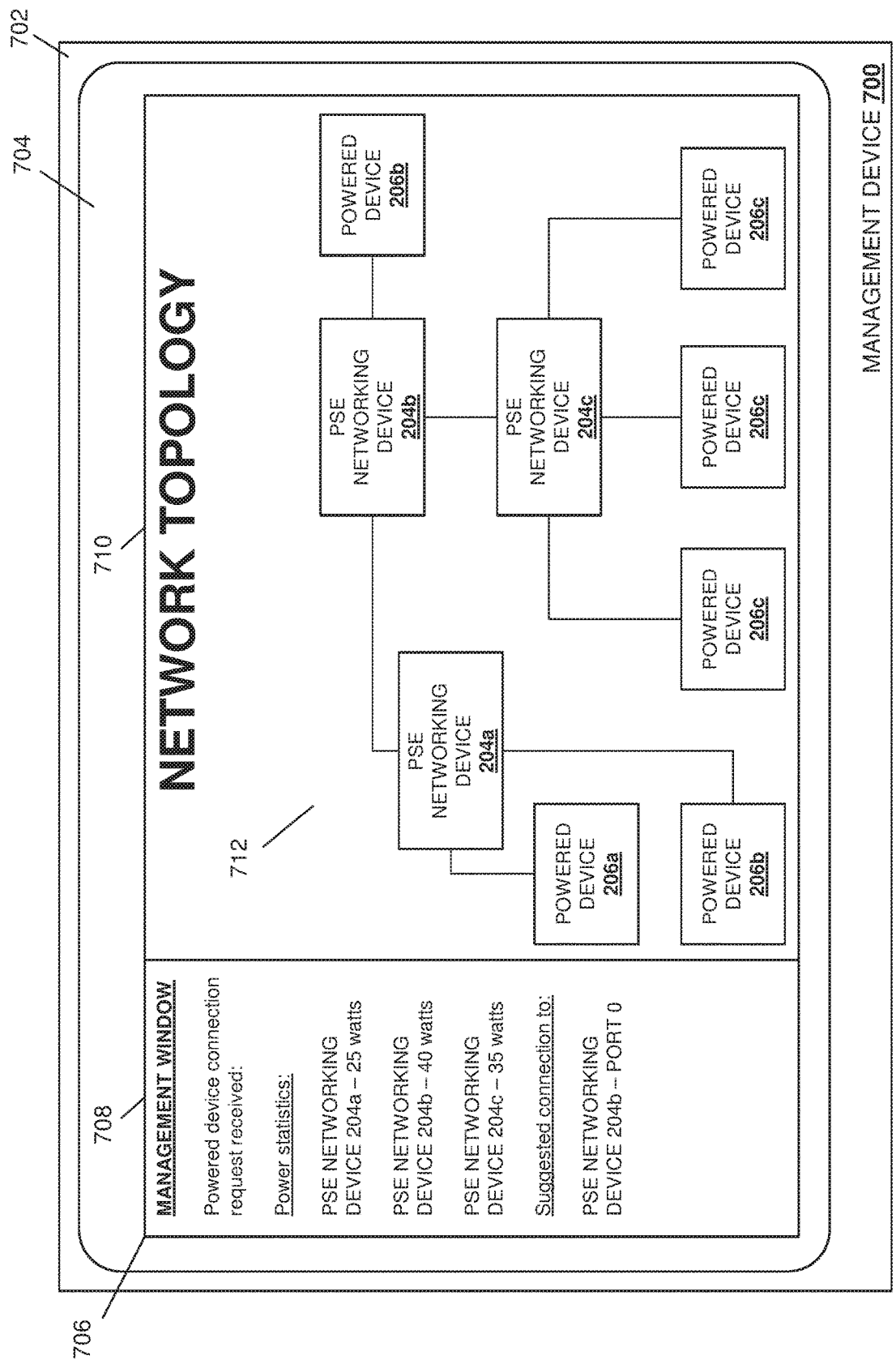
FIG. 9 is a screen shot illustrating an embodiment of a management graphical user interface that may be provided during the method of FIG. 5.

Referring now to FIG. 9, in an embodiment of block 508, a user may provide a request in the management window 708 to connect a powered device to a PSE networking device in the SDN controller PoE management system 200. For example, a user may have a powered device they would like to connect to their network, and at block 508 may utilize the management device to determine which PSE networking device 204*a-c* would be optimal for powering that powered device. At block 508, in response to receiving the request, the SDN controller power management engine 304 may utilize the PoE information received at block 504 to determine which of the PSE networking devices 204*a-c* should be used to power the powered device. FIG. 9 illustrates the management window 708 displaying an indication that the powered device connection request has been received, PoE power availability statistics for each of the PSE networking devices 204*a-c* (e.g., 25 watts of PoE power available from the PSE networking device 204*a*, 40 watts of PoE power available from the PSE networking device 204*b*, and 35 watts of PoE power available from the PSE networking device 204*c*), and a suggestion to power the powered device from a port (e.g. "PORT 0") on the PSE networking device 204*b* (e.g., because it is the PSE networking device in the network topology with the most available PoE power.) As such, decisions about configuring or updating the SDN controlled PoE management system 200 to add, remove, or otherwise reconfigure the network topology can be made based on a global/centralized view of the PoE capabilities and statistics, which allows a user to make PoE network decisions based on power utilization and power availability in the network and reduces the time and effort necessary to plan for a connection of a powered device to the network.

Figure 10:
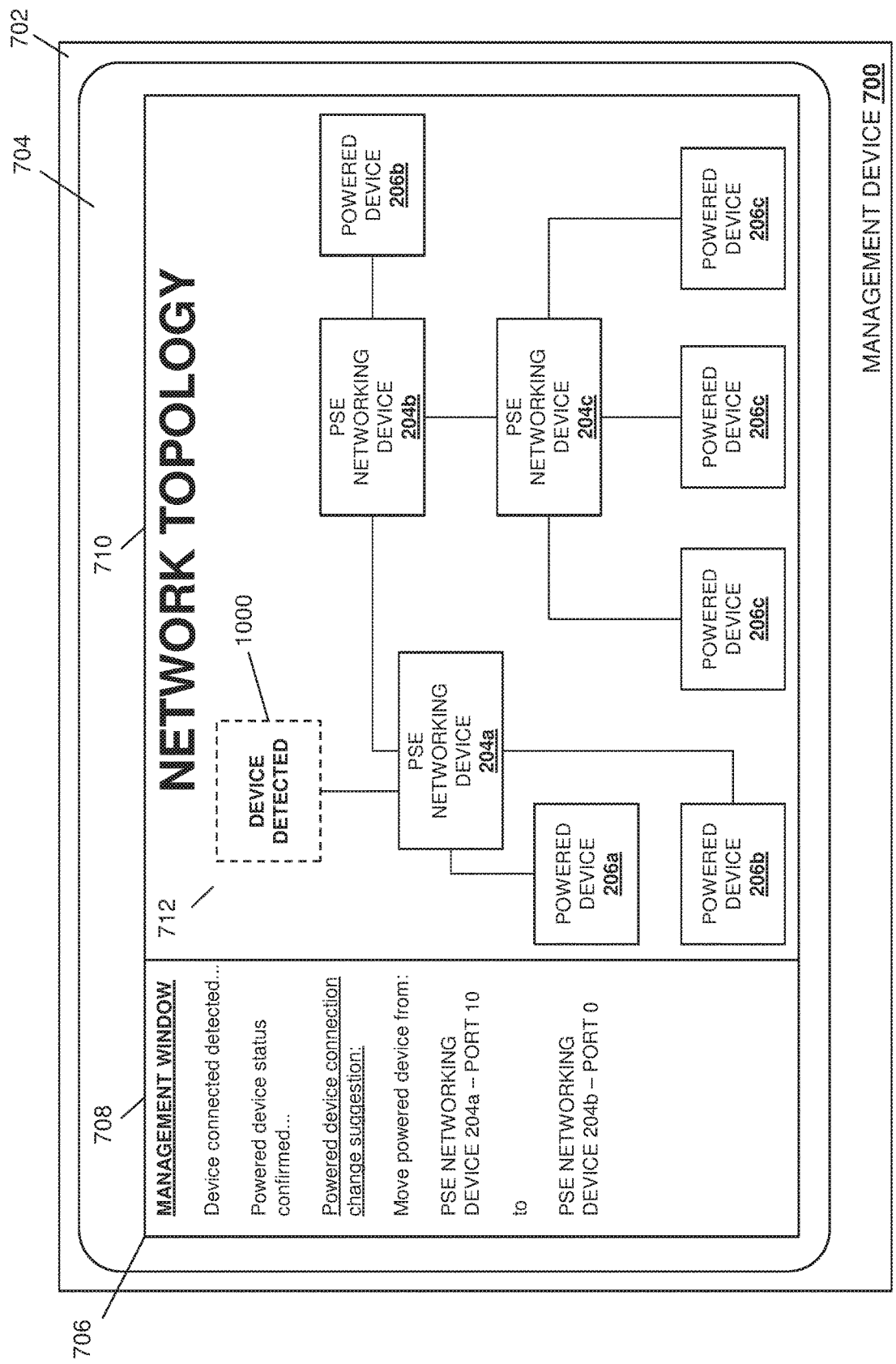
FIG. 10 is a screen shot illustrating an embodiment of a management graphical user interface that may be provided during the method of FIG. 5.

Referring now to FIG. 10, in an embodiment of block 508, a user may connect a powered device to a PSE networking device in the SDN controller PoE management system 200 without first identifying that PSE networking device as discussed above with reference to FIG. 9. For example, a user may connect a powered device to the PSE networking device 204*a*, and at block 508 the PSE networking power management engine 404 in that PSE networking device 204*a*/400 may report that powered device connection (e.g., via the communication subsystem 408 and the communication subsystem 308) to the SDN controller power management engine 304 in the SDN controller device 202/300 (e.g., by sending a "port up" notification in response to the connection of that powered device). In response, the SDN controller power management engine 404 may analyze that powered device connection and, in some situations, utilize the PoE information received at block 504 to determine that another of the PSE networking devices 204a-c would be more optimal for powering that powered device. FIG. 10 illustrates the management window 708 displaying an indication that the powered device connection has been detected (along with the network topology section 710 displaying an identifier 1000 for the detected powered device), a confirmation of the status of the powered device, and a suggestion to disconnect the powered device from a port (e.g. "PORT 10") on the PSE networking device 204b, and reconnect the powered device to a port (e.g., "(e.g., "PORT 0") on the PSE networking device 204b (e.g., because that PSE networking device 204b has more available PoE power.) As such, decisions about reconfiguring or updating the SDN controlled PoE management system 200 to move or otherwise reconfigure the network topology can be made based on a global/centralized view of the PoE capabilities and statistics, which allows the system to make PoE network decisions based on power utilization and power availability in the network.

Thus, systems and methods have been described that provide for centralized PoE management of a plurality of PSE networking devices in a network via SDN protocols such as the OpenFlow protocol. An Openflow controller may utilize conventional and modified Openflow protocol communications to detect a plurality of OpenFlow switches in a network topology, identify powered devices coupled to those OpenFlow switches, identify PoE feature capabilities of those OpenFlow switches, modify PoE functionality of those OpenFlow switches, and retrieve PoE usages statistics of those OpenFlow switches (as well as the powered devices.) As described above, such enhanced PoE management OpenFlow controller functionality extends the switch feature detection and port state modification functionality present using the OpenFlow protocol in order to enables the centralized management of the PoE capabilities and functionality in a PoE enabled network, providing an OpenFlow controller that is aware of all PoE capabilities in the network, PoE consumption throughout the network, and/or other network-wide PoE information, which provides for PoE optimization and efficiency in a manner that simply is not possible in conventional PoE management systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Software Defined Networking (SDN) controlled Power over Ethernet (PoE) management system, comprising:
   a plurality of Power Sourcing Equipment (PSE) networking devices that include one or more PoE ports that are each configured to provide both power and data over a network connection to a powered device; and
   a Software Defined Networking (SDN) controller device that is coupled to each of the plurality of PSE networking devices, wherein the SDN controller device is configured to:
     detect, based on an SDN discovery protocol advertisement received from each of the plurality of PSE networking devices, each of the plurality of PSE networking devices;
     receive, from each of the plurality of PSE networking devices, a first SDN communication that utilizes an SDN protocol and that includes Power over Ethernet (PoE) information for that PSE networking device, wherein the PoE information includes an indication that that PSE networking device is a PoE capable networking device;
     provide, to a first PSE networking device included in the plurality of PSE networking devices, a second SDN communication that includes PoE modification instructions that are configured to cause the first PSE networking device to modify the operation of at least one PoE enabled port on the first PSE networking device; and
     generate a management graphical user interface that is configured to display any of the PoE information that was received in the first SDN communications from each of the plurality of PSE networking devices.

2. The system of claim 1, wherein the PoE information includes PoE capabilities for each of the plurality of PSE networking devices.

3. The system of claim 1, wherein the PoE information includes PoE usage statistics for each of the plurality of PSE networking devices.

4. The system of claim 1, wherein the PoE information includes information about each powered device that is connected to each of the plurality of PSE networking devices.

5. The system of claim 1, wherein the SDN controller device is configured to:
   receive a request to connect a powered device to one of the plurality of PSE networking devices;
   use the PoE information to determine the first PSE networking device of the plurality of PSE networking devices that has sufficient power to power the powered device; and
   identify the first PSE networking device using the management graphical user interface.

6. The system of claim 1, wherein the SDN controller device is configured to:
   detect a connection of a powered device to the first PSE networking device of the plurality of PSE networking devices;
   use the PoE information to determine the second PSE networking device of the plurality of PSE networking devices that has more power available to power the powered device relative to the first PSE networking device; and
   identify the second PSE networking device using the management graphical user interface.

7. An Information Handling System (IHS), comprising:
   a communication system;
   a processing system that is coupled to the communication system; and
   a memory system that is coupled to the processing system and that includes instructions that, when executed by the processing system, cause the processing system to provide an Software Defined Networking (SDN) controller power management engine that is configured to:

detect, based on an SDN discovery protocol advertisement received from each of a plurality of PSE networking devices and via the communication system, a plurality of Power Sourcing Equipment (PSE) networking devices that include one or more Power over Ethernet (PoE) ports that are each configured to provide both power and data over a network connection to a powered device;

receive, from each of the plurality of PSE networking devices via the communication system, a first SDN communication that utilizes an SDN protocol and that includes PoE information for that PSE networking device, wherein the PoE information includes an indication that that PSE networking device is a PoE capable networking device;

provide, to a first PSE networking device included in the plurality of PSE networking devices, a second SDN communication that includes PoE modification instructions that are configured to cause the first PSE networking device to modify the operation of at least one PoE enabled port on the first PSE networking device; and generate a management graphical user interface that is configured to display any of the PoE information that was received in the first SDN communications from each of the plurality of PSE networking devices.

8. The IHS of claim 7, wherein the PoE information includes PoE capabilities for each of the plurality of PSE networking devices.

9. The IHS of claim 7, wherein the PoE information includes PoE usage statistics for each of the plurality of PSE networking devices.

10. The IHS of claim 7, wherein the SDN controller power management engine is configured to:

receive a request to connect a powered device to one of the plurality of PSE networking devices;

use the PoE information to determine the first PSE networking device of the plurality of PSE networking devices that has sufficient power to power the powered device; and identify the first PSE networking device using the management graphical user interface.

11. The IHS of claim 7, wherein the SDN controller power management engine is configured to:

detect a connection of a powered device to the first PSE networking device of the plurality of PSE networking devices;

use the PoE information to determine the second PSE networking device of the plurality of PSE networking devices that has more power available to power the powered device relative to the first PSE networking device; and identify the second PSE networking device using the management graphical user interface.

12. A method for Software Defined Networking (SDN) controlled Power over Ethernet (PoE) management, comprising:

detecting, by a Software Defined Networking (SDN) controller device based on an SDN discovery protocol advertisement received from each of a plurality of Power Sourcing Equipment (PSE) networking devices, a plurality of PSE networking devices that include one or more POE ports that are each configured to provide both power and data over a network connection to a powered device;

receiving, by the SDN controller device from each of the plurality of PSE networking devices, a first SDN communication that utilizes an SDN protocol and that includes PoE information for that PSE networking device, wherein the PoE information includes an indication that that PSE networking device is a PoE capable networking device;

providing, by the SDN controller device to a first PSE networking device included in the plurality of PSE networking devices, a second SDN communication that includes PoE modification instructions that are configured to cause the first PSE networking device to modify the operation of at least one PoE enabled port on the first PSE networking device; and generating, by the SDN controller device, a management graphical user interface that is configured to display any of the PoE information that was received in the first SDN communications from each of the plurality of PSE networking devices.

13. The method of claim 12, wherein the PoE information includes PoE capabilities for each of the plurality of PSE networking devices.

14. The method of claim 12, wherein the PoE information includes PoE usage statistics for each of the plurality of PSE networking devices.

15. The method of claim 12, wherein the PoE information includes information about each powered device that is connected to each of the plurality of PSE networking devices.

16. The method of claim 12, further comprising:

receiving, by the SDN controller device, a request to connect a powered device to one of the plurality of PSE networking devices;

using, by the SDN controller device, the PoE information to determine the first PSE networking device of the plurality of PSE networking devices that has sufficient power to power the powered device; and identifying, by the SDN controller device, the first PSE networking device using the management graphical user interface.

17. The method of claim 12, further comprising:

detecting, by the SDN controller device, a connection of a powered device to the first PSE networking device of the plurality of PSE networking devices;

using, by the SDN controller device, the PoE information to determine the second PSE networking device of the plurality of PSE networking devices that has more power available to power the powered device relative to the first PSE networking device; and identifying, by the SDN controller device, the second PSE networking device using the management graphical user interface.

* * * * *